Sept. 11, 1951 W. K. HOLLERON ET AL 2,567,562
SHEAVE
Filed June 16, 1947
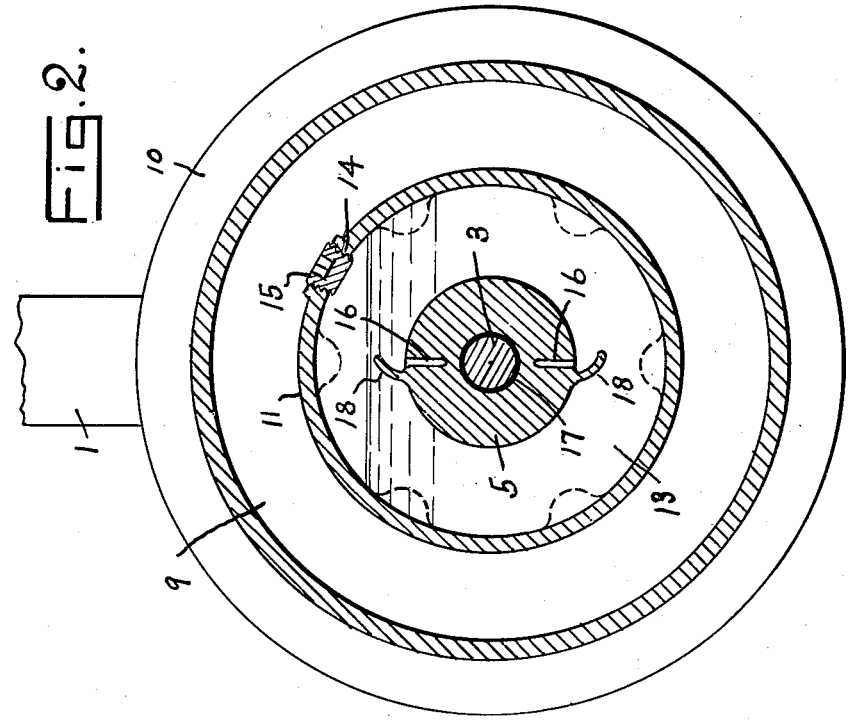
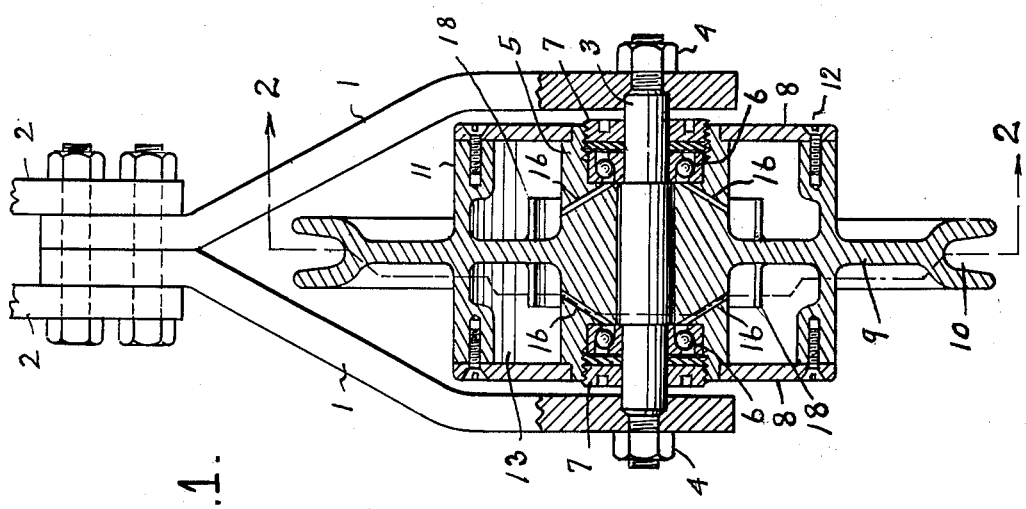
Inventors
William K. Holleron
William L. Buckley
By
E. V. Hardaway, Attorney Patented Sept. 11, 1951

2,567,562

UNITED STATES PATENT OFFICE 2,567,562

SHEAVE

William K. Holleron and William L. Buckley, Victoria, Tex.

Application June 16, 1947, Serial No. 754,886

6 Claims. (Cl. 308—117)

This invention relates to a sheave and has particular relation to novel means for lubricating the sheave bearings.

The sheave herein described is particularly adapted for use in running a coring line in taking cores from wells.

An object of the present invention is to provide a sheave containing an internal chamber for containing the lubricant with ducts leading from said chamber through the hub of the sheave to the sheave bearings.

It is another object of the invention to provide a sheave of the character described provided with an internal, lubricant-containing chamber with ducts leading through the hub of the sheave to the bearings and with external baffles, or scoops, on said hub which will direct the lubricant to said bearings irrespective of the direction of rotation of the sheave.

Other objects and advantages will be apparent from the following specification which is illustrated in the accompanying drawings, wherein—

Figure 1 is a longitudinal, sectional view of the sheave and

Figure 2 is a transverse, sectional view taken on the line 2—2 of Figure 1.

Referring now more particularly to the drawings, wherein like numerals of reference designate the same parts in each of the figures, the numerals 1, 1 designate similar bars forming the bail of the sheave.

The upper ends of these bars are fitted together and bolted to them are the hangers 2, 2. The bars 1 diverge downwardly and their lower ends are parallel. The numeral 3 designates the sheave supporting axle whose ends extend through corresponding bearings in the bail and are threaded to receive the clamp nuts 4, 4.

The numeral 5 designates the sheave hub which is mounted to rotate on the axle 3. Mounted within the ends of the hub are the antifriction bearing assemblies 6, 6 which are retained in place by the retaining nuts 7, 7 which are screwed into the ends of the hub.

Mounted on the ends of the hub are the end plates 8, 8 which are of circular shape.

The sheave proper 9 is of disc-like formation and is formed integrally with the hub and is provided with a drum 11 which is formed integrally therewith and the outer margins of the plates 8 are secured to the ends of the drum in any preferred manner, as by set screws 12.

Lubricant containing chambers 13 are thus enclosed about the hub 5 and these chambers have inlet openings, as 14, through the drum 11 and which are normally closed by plugs, as 15, thus providing means for replenishing the lubricant in the chambers 13.

Leading inwardly through the hub 5 from the respective chambers 13 to the gearing assemblies 6 there are the oppositely disposed pairs of ducts 16, 16 through which the lubricant may reach said bearing assemblies.

It is to be noted that between said bearing assemblies the axle bore through the hub, provided to receive the axle, is slightly larger than the transverse diameter of the axle thus providing an annular space 17 between the intermediate portion of the hub bearing and the axle so that the lubricant may freely circulate about the axle.

There are the longitudinal external baffles 18, 18 on the hub 5 which are located behind the corresponding ducts 16 and which are forwardly curved. These baffles tend to force the lubricant through the corresponding ducts 16 irrespective of the direction of rotation of the sheave.

It is understood that during the rotation of the sheave, particularly at a high rate of speed, the centrifugal force will tend to cause an outward flow of the lubricant but in carrying on the work which this type of sheave is adapted for the sheave will rotate only intermittently and even though the chambers 13 should not be completely filled with the lubricant sufficient lubricant will be supplied to the bearing assemblies and to the axle to keep the sheave adequately lubricated.

The drawings and description are illustrative merely while the broad principle of the invention will be defined by the appended claims.

What we claim is:

1. A sheave comprising, an axle, a hub mounted to rotate on the axle and spaced therefrom to form a lubricant receiving enclosure about the axle, and said hub having a duct leading to the said enclosure, a line supporting element on the hub and having an enclosed lubricant containing chamber with which said duct communicates, an external baffle on the hub located adjacent and rearwardly of said duct, said baffle being forwardly curved.

2. A device of the character described comprising, a hub, an axle, spaced bearing means on the axle on which the hub is rotatably mounted, said hub being spaced from the axle to form a passageway communicating with said bearing means, a line supporting element on the hub having an enclosed lubricant containing chamber, said hub having ducts leading from said lubricant chamber to each of the bearing means, a baffle on the hub located rearwardly of and adjacent the outer end of the duct.

3. A sheave comprising, an axle, a hub mounted to rotate on the axle and spaced therefrom to form a lubricant receiving enclosure around the axle, said hub also having a plurality of ducts leading to opposite ends of the enclosure, a line-supporting element on the hub and having an enclosed lubricant-containing chamber with which said ducts communicate, external baffles on the hub located behind the corresponding ducts and extending out radially and whose outer ends are forwardly curved to assist in forcing the lubricant through the corresponding duct irrespective of the direction of rotation of the sheave.

4. A sheave comprising, an axle, a hub mounted on the axle, said hub having an annular bearing recess, said axle forming the inner wall of said recess, a line supporting element on the hub and having an enclosed lubricant containing chamber, said hub having a duct communicating with the chamber and opening into the recess at a point between the axle and the outer wall of the recess.

5. A sheave comprising, an axle, a hub mounted on the axle, said hub having an annular bearing recess surrounding the axle, a line supporting element on the hub and having an enclosed lubricant containing chamber disposed radially outwardly of the recess, said hub having a duct communicating with the chamber and opening into the recess at a point spaced radially inwardly from the outer wall of the recess.

6. A sheave comprising, an axle, a hub mounted on the axle, and having annular bearing recesses in its opposite ends through which the axle passes, a line supporting element on the hub and having an annular enclosed lubricant receiving chamber whose inner wall is formed by the hub, said hub having ducts communicating with said chamber and opening into said recesses at points spaced radially inwardly of the outer walls of the recesses.

WILLIAM K. HOLLERON.
WILLIAM L. BUCKLEY.

REFERENCES CITED

The following references are of record in the file of this patent:

UNITED STATES PATENTS

| Number | Name | Date |
|---|---|---|
| 309,554 | McCaffrey | Dec. 23, 1884 |
| 810,157 | Britt | Jan. 16, 1906 |
| 888,993 | Gass | May 26, 1908 |
| 1,618,123 | Edwards | Feb. 15, 1927 |
| 1,973,710 | Ivitsky | Sept. 18, 1934 |

FOREIGN PATENTS

| Number | Country | Date |
|---|---|---|
| 174,394 | Canada | Jan. 9, 1917 |